(12) United States Patent
Takahashi et al.

(10) Patent No.: US 11,816,918 B2
(45) Date of Patent: Nov. 14, 2023

(54) ELECTRONIC APPARATUS

(71) Applicant: Japan Display Inc., Tokyo (JP)

(72) Inventors: Yasuhiro Takahashi, Tokyo (JP); Junko Nagasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 21 days.

(21) Appl. No.: 17/574,663

(22) Filed: Jan. 13, 2022

(65) Prior Publication Data

US 2022/0222965 A1  Jul. 14, 2022

(30) Foreign Application Priority Data

Jan. 13, 2021  (JP) ................................ 2021-003648

(51) Int. Cl.
*G06V 40/13* (2022.01)
*G02F 1/1335* (2006.01)
*G02F 1/1333* (2006.01)

(52) U.S. Cl.
CPC ...... *G06V 40/1318* (2022.01); *G02F 1/13338* (2013.01); *G02F 1/133345* (2013.01); *G02F 1/133512* (2013.01); *G02F 1/133514* (2013.01); *G02F 1/133526* (2013.01)

(58) Field of Classification Search
CPC .......... G06V 40/1318; G02F 1/133345; G02F 1/13338; G02F 1/133512; G02F 1/133514; G02F 1/133526

USPC .......................................................... 349/12
See application file for complete search history.

(56) References Cited

U.S. PATENT DOCUMENTS

2018/0150671 A1    5/2018 Choo et al.

FOREIGN PATENT DOCUMENTS

| CN | 112882279 A | * | 6/2021 | ........... G02F 1/1335 |
| JP | 2018-87973 A | | 6/2018 | |

* cited by examiner

*Primary Examiner* — Edward J Glick
*Assistant Examiner* — William D Peterson
(74) *Attorney, Agent, or Firm* — Maier & Maier, PLLC (57) ABSTRACT

According to one embodiment, an electronic apparatus comprises a first substrate that includes a sensor element, a first light-shielding layer, and a first pinhole that is provided between the first light-shielding layers adjacent to each other, and a second substrate that includes a second light-shielding layer that is provided in contact with a base, a second pinhole that is provided between the second light-shielding layers adjacent to each other, a third light-shielding layer that is in contact with an insulating layer, a third pinhole that is provided between the third light-shielding layers adjacent to each other, wherein a transparent resin layer is provided inside the third pinhole.

20 Claims, 9 Drawing Sheets

ELECTRONIC APPARATUS

CROSS-REFERENCE TO RELATED APPLICATIONS

This application is based upon and claims the benefit of priority from Japanese Patent Application No. 2021-003648, filed Jan. 13, 2021, the entire contents of which are incorporated herein by reference.

FIELD

An embodiment of the present invention relates to an electronic apparatus.

BACKGROUND

In recent years, an authentication system is installed in an electronic device in order to limit access to the electronic device. A biosensor is used in the authentication system. An optical biosensor is known as a biosensor used for personal authentication or the like. A fingerprint sensors and a vein sensor are known as the optical biosensor. In the fingerprint sensor, a plurality of photoelectric conversion elements are arranged on a substrate. In each of the photoelectric conversion elements, a signal output in accordance with an amount of light radiated is changed.

DETAILED DESCRIPTION

According to one embodiment, an electronic apparatus comprises a first substrate that includes a sensor element, a first light-shielding layer, and a first pinhole that overlaps with the sensor element and is provided between the first light-shielding layers adjacent to each other; and a second substrate that includes a base, a second light-shielding layer that is provided in contact with the base, a second pinhole that overlaps with the sensor element and is provided between the second light-shielding layers adjacent to each other, an insulating layer that covers the second light-shielding layer and the second pinhole, a third light-shielding layer that is in contact with the insulating layer, a third pinhole that overlaps with the sensor element and is provided between the third light-shielding layers adjacent to each other, and a lens that is in contact with the base and provided on a surface opposite to the second light-shielding layer, wherein a transparent resin layer is provided inside the third pinhole.

According to another embodiment, an electronic apparatus comprises a first substrate that includes a sensor element, a first light-shielding layer, and a first pinhole that overlaps with the sensor element and is provided between the first light-shielding layers adjacent to each other; and a second substrate that includes a base, a second light-shielding layer that is provided so as to be overlapped with a part of the base, a second pinhole that overlaps with the sensor element and is provided between the second light-shielding layers adjacent to each other, a first insulating layer that covers the second light-shielding layer and the second pinhole, a second insulating layer that is provided in contact with the first insulating layer, a third light-shielding layer that is in contact with the second insulating layer, a third pinhole that overlaps with the sensor element, is provided between the third light-shielding layers adjacent to each other, and is in contact with the second insulating layer, and a lens that is in contact with the base and provided on a surface opposite to the first light-shielding layer, wherein the second insulating layer is a colored resin layer that shields light having a certain wavelength.

According to another embodiment, an electronic apparatus comprises a first substrate that includes a sensor element, a first light-shielding layer, and a first pinhole that overlaps with the sensor element and is provided between the first light-shielding layers adjacent to each other; and a second substrate that includes a base, a second light-shielding layer that is provided so as to be overlapped with a part of the base, a second pinhole that overlaps with the sensor element and is provided between the second light-shielding layers adjacent to each other, a first insulating layer that covers the second light-shielding layer and the second pinhole, a third light-shielding layer that is in contact with the first insulating layer, a third pinhole that overlaps with the sensor element, is provided between the third light-shielding layers adjacent to each other, and is in contact with the first insulating layer, a second insulating layer that is provided inside the third pinhole, is provided between the third light-shielding layers adjacent to each other, and is in contact with the first insulating layer, and a lens that is in contact with the base and provided on a surface opposite to the first light-shielding layer, wherein the second insulating layer is a colored resin layer that shields light having a certain wavelength.

According to the present embodiment, it is possible to provide an electronic apparatus having a pinhole having sufficient translucency.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

An embodiment will now de described in detail with reference to accompanying drawings.

In the following descriptions, for example, a first direction X, a second direction Y and a third direction Z are orthogonal to each other, but may intersect at an angle other than ninety degrees. A direction forwarding a tip of an arrow indicating the third direction Z is referred to as "upward" and a direction forwarding oppositely from the tip of the arrow is referred to as "downward".

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the semiconductor substrate on a tip side of an arrow in a third direction Z, and viewing from this observation position toward the X-Y plane defined by the first direction X and the second direction Y is referred to as a planar view. Viewing a cross section of the semiconductor substrate in an X-Z plane defined by the first direction X and the third direction Z or a Y-Z plane defined by the second direction Y and the third direction Z is referred to as a cross-sectional view.

EMBODIMENT

Figure 1:
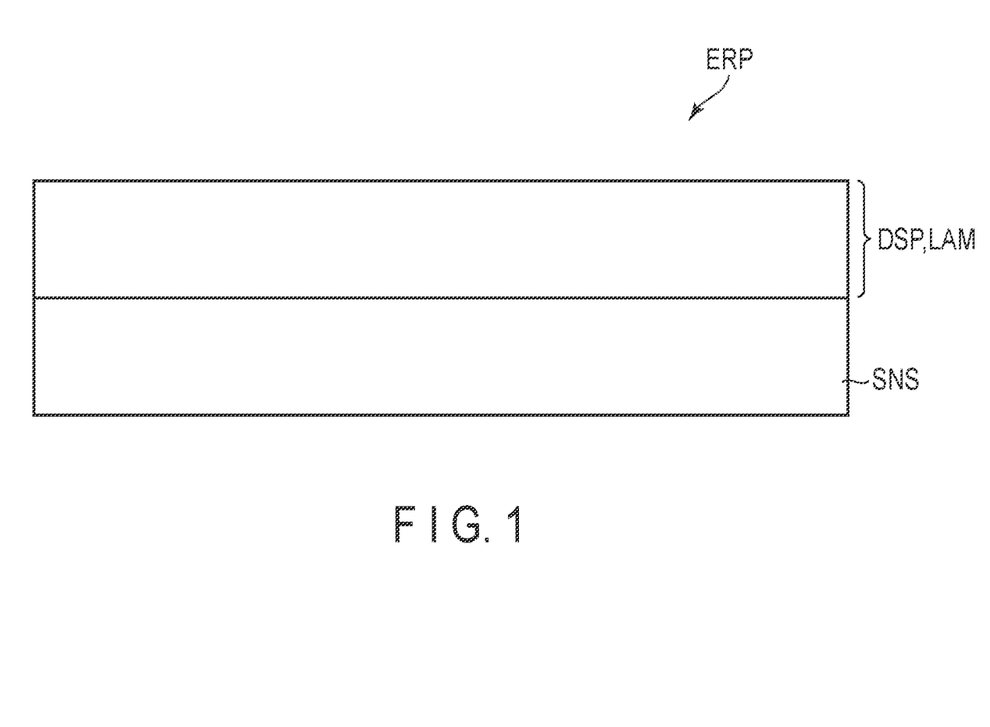
FIG. 1 is a schematic cross-sectional view illustrating an electronic apparatus according to an embodiment.

FIG. 1 is a schematic cross-sectional view illustrating an electronic apparatus according to an embodiment. An electronic apparatus ERP includes a sensor board SNS, a display device DSP, and an optical adjustment element LAM. The display device DSP and the optical adjustment element LAM may be integrally formed as will be described later. The sensor board SNS, the display device DSP, and the optical adjustment element LAM may be integrally formed. The sensor board SNS and the optical adjustment element LAM may be provided inside the display device DSP.

Although the details will be described later, the sensor board SNS includes a sensor element SNE configuring an optical fingerprint sensor. In FIG. 1, the display device DSP is a liquid crystal display device including a liquid crystal layer LCL.

As one of collimator methods for the optical fingerprint sensor, a method using a microlens and a pinhole is adopted. The pinhole is disposed at a focal length of the microlens. However, for example, it may be difficult to form a pinhole having a small diameter in a light-shielding resin material in relation to a thickness.

Therefore, in the present embodiment, by providing a transparent resin layer in the pinhole, it is possible to form the pinhole having a small diameter in the light-shielding resin material. Details will be described below.

Figure 2:
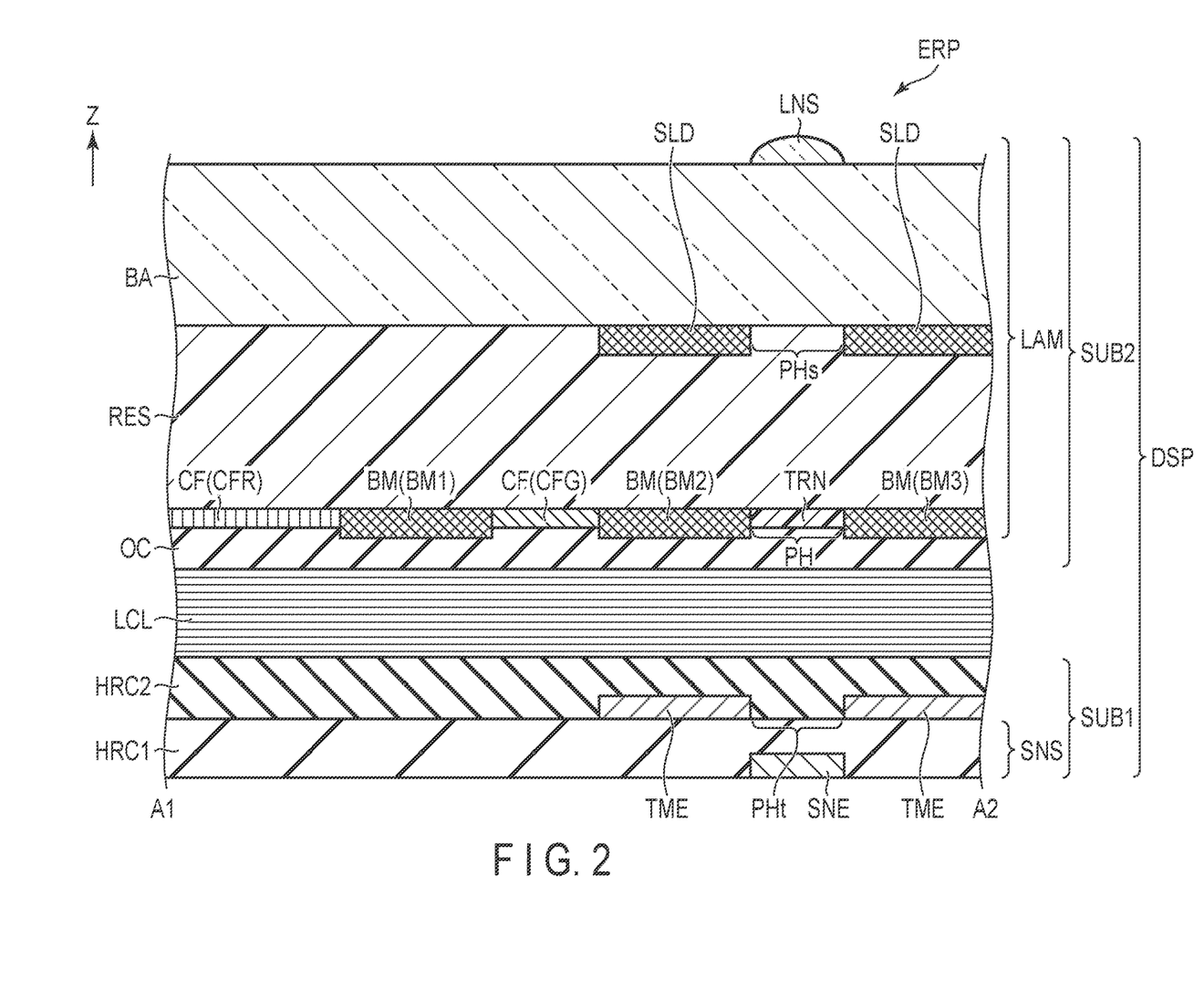
FIG. 2 is a partial cross-sectional view of the electronic apparatus according to the embodiment.

FIG. 2 is a partial cross-sectional view of the electronic apparatus according to the embodiment. In FIG. 2, the sensor board SNS includes the sensor element SNE and an insulating layer HRC1 covering the sensor element SNE.

The sensor element SNE is a sensor element using a photoelectric conversion element, for example, a photodiode.

The sensor element SNE may be provided inside the display device DSP. Although not illustrated in FIG. 2, a switching element for driving the liquid crystal layer LCL to be described later may be provided below the sensor element SNE. Another base opposed to a base BA to be described later may be provided to the sensor element SNE.

A light-shielding layer TME is provided on the insulating layer HRC1. The light-shielding layer TME is a light-shielding layer that shields a part of light incident on the sensor element SNE. An insulating layer HRC2 is provided so as to cover the insulating layer HRC1 and the light-shielding layer TME. The insulating layers HRC1 and HRC2 are formed of, for example, an organic insulating resin material having a flattening function. The light-shielding layer TME is formed of, for example, a metal material, more specifically, a laminated film in which aluminum is sandwiched between molybdenum. However, the light-shielding layer TME may be formed of the same material as that of the light-shielding layer BM to be described later, instead of the metal material.

The liquid crystal layer LCL is provided on the insulating layer HRC2 via an alignment film not illustrated.

An insulating layer OC is provided on the liquid crystal layer LCL via the alignment film not illustrated. It can be said that the liquid crystal layer LCL is sandwiched between the insulating layers HRC2 and OC. The insulating layer OC is formed of, for example, the organic insulating resin material.

A color filter CF (CFR and CFG) is provided on the insulating layer OC. The light-shielding layer BM (BM1) is provided between a red color filter CFR and a green color filter CFG. The green color filter CFG is provided between light-shielding layers BM1 and BM2. The light-shielding layers BM1 and BM2 are formed of, for example, a resin material having a light-shielding layer, specifically, a resin material containing a black pigment.

A transparent resin layer TRN is provided to be adjacent to the light-shielding layer BM2. The transparent resin layer TRN is provided between the light-shielding layers BM2 and BM3. The transparent resin layer TRN is formed of a resin material.

Figure 3:
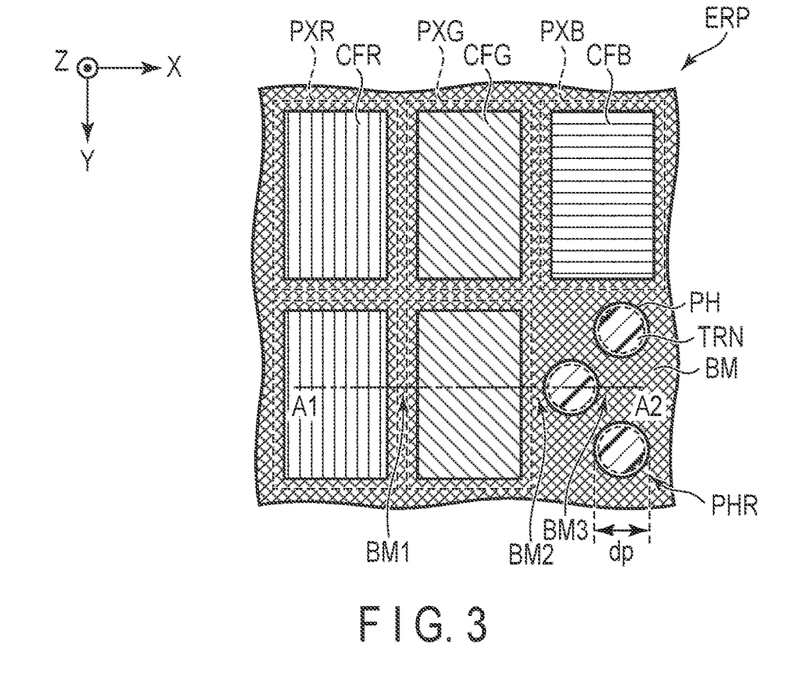
FIG. 3 is a partial plan view of an electronic apparatus.

In FIG. 2, the light-shielding layers BM1 to BM3 will be described separately. As illustrated in FIG. 3 to be described later, the light-shielding layers BM1 to BM3 are integrally formed light-shielding layers. A distance (thickness) between the light-shielding layer BM and the light-shielding layer TME in the third direction Z may be in a range of, for example, 3 μm or greater and 15 μm or less, and preferably 5 μm or greater and 10 μm or less, including the liquid crystal layer LCL.

An insulating layer RES is provided in contact with the color filter CF, the transparent resin layer TRN, and the light-shielding layer BM. The insulating layer RES is formed of, for example, a photosensitive resin material.

A light-shielding layer SLD is provided in contact with the base BA, and the light-shielding layer SLD is covered by the insulating layer RES described above. The light-shielding layer SLD is formed of the same material as those of the light-shielding layers BM1 and BM2. The light-shielding layer SLD has a function of shielding unnecessary light among the light reaching the sensor element SNE. A thickness of the light-shielding layer SLD may be the same as that of the light-shielding layer BM. However, the present invention is not limited to this, and the thicknesses of the light-shielding layer SLD and the light-shielding layer BM may be different from each other.

A lens LNS is provided on a surface of the base BA opposite to the surface on which the light-shielding layer SLD is provided. The lens LNS may be provided in direct contact with the base BA, or may be attached to the base BA via an adhesive not illustrated.

In FIG. 2, a pinhole PH is formed in a region between the light-shielding layers BM2 and BM3 which are adjacent to each other. The pinhole PH is overlapped with a part of the base BA, a part of the insulating layer RES, and the transparent resin layer TRN in the region. The pinhole PH may be disposed at a focal length of the lens LNS.

The light-shielding layer BM, the transparent resin layer TRN, the insulating layer RES, the light-shielding layer SLD, and the lens LNS form the optical adjustment element LAM illustrated in FIG. 1.

In FIG. 2, a component formed by stacking components from the sensor element SNE to the insulating layer HRC2 in the third direction Z is referred to as a substrate SUB1.

A component formed by stacking components from the base BA to the insulating layer OC in a direction opposite to the third direction Z, and the lens LNS are referred to as a substrate SUB2. That is, in the substrate SUB2, the light-shielding layer SLD is provided in contact with the base BA, and the insulating layer RES is formed so as to cover the light-shielding layer SLD. The light-shielding layer BM, the color filter CF, and the transparent resin layer TRN are provided in contact with the insulating layer RES. The insulating layer OC is formed so as to cover the light-shielding layer BM, the color filter CF, and the transparent resin layer TRN. The lens LNS is disposed on the surface of the base BA opposite to the surface with which the light-shielding layer SLD is in contact.

The liquid crystal layer LCL is sandwiched between the substrates SUB1 and SUB2.

Pinholes PHs and PHt are also formed in a region between the light-shielding layers SLD adjacent to each other and a region between the light-shielding layers TME adjacent to each other, respectively. That is, the pinholes PHt, PH, and PHs are provided so as to be overlapped with the sensor element SNE in this order along the third direction Z. Light incident on the electronic apparatus ERP via the lens LNS passes through the pinholes PHs, PH, and PHt and reaches the sensor element SNE. The pinhole PH may be disposed at a focal length of the lens LNS. Diameters of the pinholes PHs, PH, and PHt may be the same.

FIG. 3 is a partial plan view of the electronic apparatus. FIG. 2 is a cross-sectional view taken along line A1-A2 of FIG. 3. The electronic apparatus ERP illustrated in FIG. 3 has a pixel PX and a pinhole forming region PHR.

The pixel PX includes a red pixel PXR, a green pixel PXG, and a blue pixel PXB. A plurality of the red pixels PXR are disposed side by side along the second direction Y. A plurality of the green pixels PXG are disposed side by side along the second direction Y. A plurality of the blue pixels PXB are disposed side by side along the second direction Y.

A pixel column of the red pixel PXR is disposed to be adjacent to the pixel column of the blue pixel PXB and the pixel column of the green pixel PXG. The pixel column of the green pixel PXG is disposed to be adjacent to the pixel column of the red pixel PXR and the pixel column of the blue pixel PXB. The pixel column of the blue pixel PXB is disposed to be adjacent to the pixel column of the green pixel PXG and the pixel column of the red pixel PXR.

In the pixel column of the blue pixel PXB, for example, the pinhole forming region PHR is provided for each row. In other words, in the pixel column of the blue pixel PXB, the blue pixel PXB and the pinhole forming region PHR are alternately provided in the second direction Y. However, the pinhole forming region PHR may not be necessarily provided in the pixel column of the blue pixel PXB, and may be provided in the pixel column of the green pixel PXG or the pixel column of the red pixel PXR. In FIG. 3, the pinhole forming region PHR is provided in the pixel column of the blue pixel PXB since the blue color has the lowest visibility for human vision as compared with the red color and the green color.

The red color filter CFR is disposed in the pixel PXR, the green color filter CFG is disposed in the pixel PXG, and the blue color filter CFB is disposed in the pixel PXB.

Though not illustrated in FIG. 3, each of the pixels PX (PXR, PXG, and PXB) is provided with the liquid crystal layer LCL or the switching element driving the liquid crystal layer LCL.

Returning to FIG. 2, the pinhole PH will be described. It is considered that the pinhole PH is formed by using the light-shielding resin material. When forming the pinhole having a small diameter, as described above, it may be difficult to form the pinhole in relation to the thickness. As a specific step, a case where the pinhole having a small diameter is formed by performing an exposure and a development on the resin material by using a mask. When the thickness of the resin material is greater, there is a possibility that the exposure amount is not sufficient, and the light does not reach the bottom portion away from the incidence surface of the light in the depth direction. In this a case, even after the development step, there is a possibility that the resin material of the bottom portion is not removed and the pinhole is not formed.

In the present embodiment, as illustrated in FIG. 2, the pinhole PH having the transparent resin layer TRN therein is formed. By forming the transparent resin layer TRN, it is possible to expose the light-shielding resin material, which is used as the material of the light-shielding layer BM, with a sufficient amount of light. Accordingly, the resin material can be assuredly removed. A manufacturing step will be described below.

Figure 4:
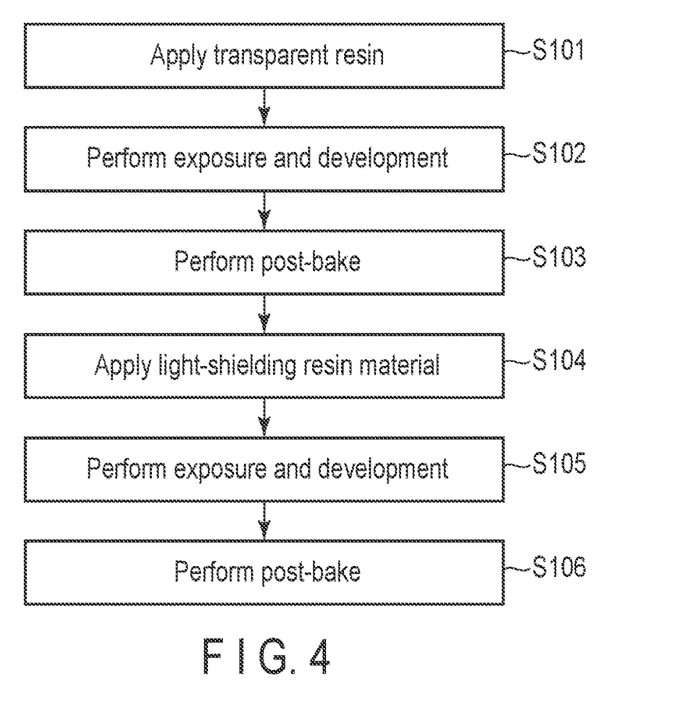
FIG. 4 is a flowchart illustrating a manufacturing step of a pinhole of the present embodiment.
Figure 5A:
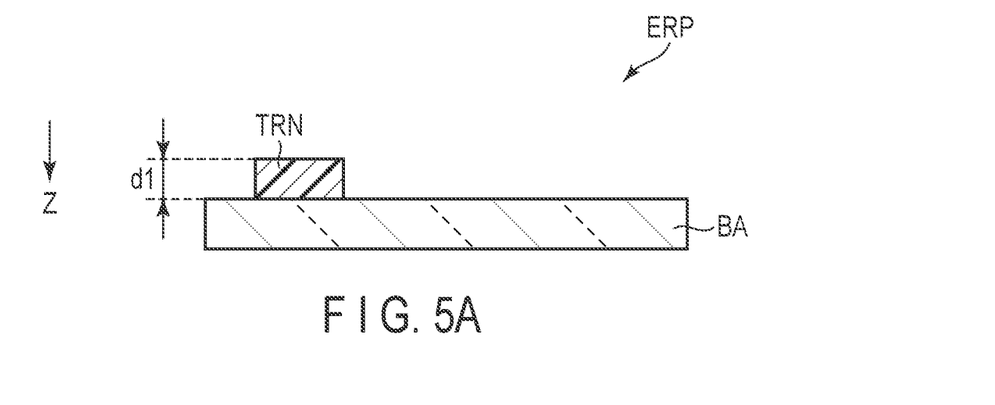
FIG. 5A is a cross-sectional view illustrating a manufacturing step of a pinhole of the present embodiment.
Figure 5B:
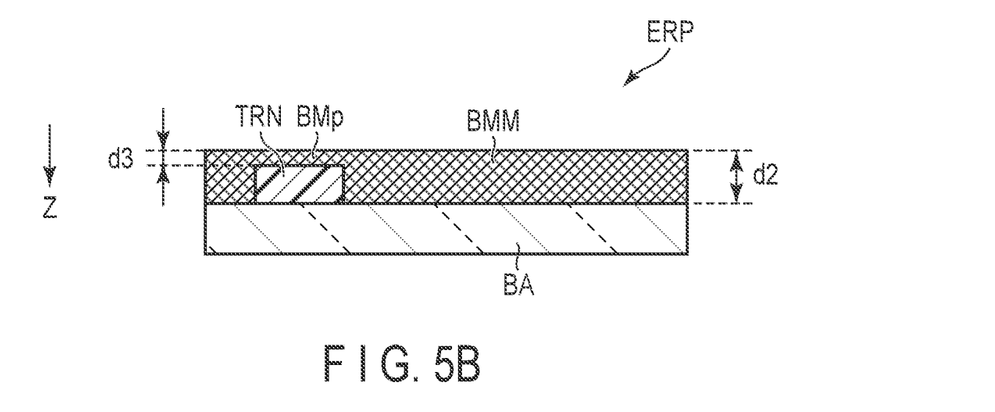
FIG. 5B is a cross-sectional view illustrating a manufacturing step of a pinhole of the present embodiment.
Figure 5C:
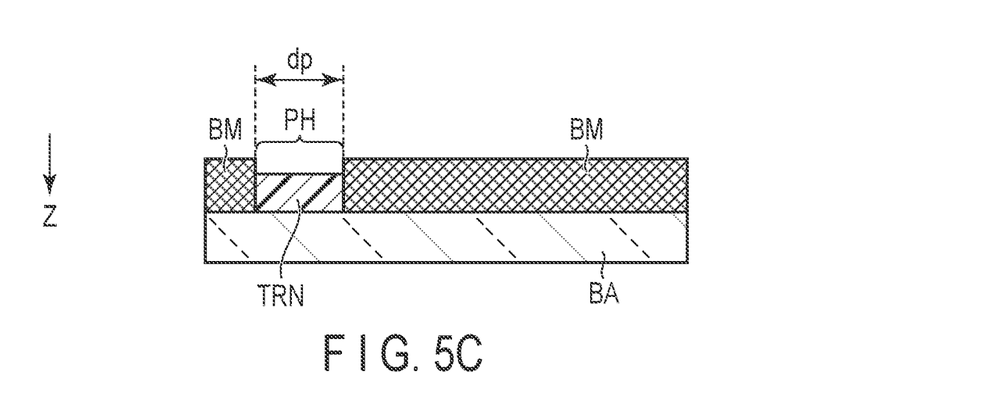
FIG. 5C is a cross-sectional view illustrating a manufacturing step of a pinhole of the present embodiment.

FIG. 4 is a flowchart illustrating the manufacturing step of the pinhole of the present embodiment. FIGS. 5A to 5C are cross-sectional views illustrating the manufacturing step of the pinhole of the present embodiment. However, in order to make the drawings easier to understand, the light-shielding layer SLD, the insulating layer RES, and the color filter CF, which are illustrated in FIG. 2, are not illustrated in FIGS. 5A to 5C.

As illustrated in FIG. 4, a transparent resin film used as a material of the transparent resin layer TRN is applied to a region in which the pinhole PH is formed by overlapping the base BA (Step S101).

As the transparent resin film, for example, a colored resin film having a function of shielding light having a certain wavelength may be used. The light having a certain wavelength is, for example, infrared light having a wavelength of an infrared range. However, the wavelength range is not limited to this.

Next, an exposure and a development are performed on the transparent resin film (Step S102) and a post-bake (baking) (Step S103) is performed to form a transparent resin layer TRN having an island-like shape (refer to FIG. 5A). When the thickness of the transparent resin layer TRN is d1, the thickness d1 may be in a range of, for example, 1.0 μm or greater and 1.7 μm, and preferably 1.3 μm or greater and 1.4 μm or less. A width of the transparent resin layer TRN in a plane perpendicular to the third direction Z (X-Y plane) is a diameter dp of the pinhole PH to be described later.

The transparent resin layer TRN is covered and overlapped with the base BA to form a light-shielding resin material film BMM which is used as a material of the light-shielding layer BM (refer to Step S104 and FIG. 5B). Here, the resin material film BMM in the region overlapping with the transparent resin layer TRN is a resin material film BMp.

When one of the transparent resin film and the resin material film BMM, which are described above, is a positive type resin, and the other thereof is preferably a negative type resin. In that case, the same exposure mask can be used in each exposure step.

When a thickness of the resin material film BMM is d2, the thickness d2 may be in a range of, for example, 1.05 μm or greater and 2.2 μm or less, preferably 1.4 μm or greater and 1.6 μm or less, and more preferably 1.5 μm. By forming the resin material film BMM within a range of such a thickness d2, the light-shielding layer BM formed later can obtain sufficient light-shielding property.

A thickness d3 of the resin material film BMp may be smaller than the thickness d2, and may be in a range of, for example, 0.05 μm or greater and 0.4 μm or less, and preferably 0.1 μm or greater and 0.2 μm or less. The thickness d3 is also a difference between the thickness d2 of the resin material film BMM and the thickness d1 of the transparent resin layer TRN.

An exposure and a development are performed on the resin material film BMM (Step S105), and a post-bake (baking) is performed (Step S106).

When the thickness d3 is as small as the thickness described above, the exposure step (Step S105) can be performed with a sufficient amount of light. As a result, the resin material film BMp provided in contact with the transparent resin layer TRN can be assuredly removed. The transparent resin layer TRN is exposed by removing the resin material film BMp. The light-shielding layer BM is formed in a region that does not overlap with the transparent resin layer TRN. Accordingly, the pinhole PH is formed (refer to FIG. 5C).

The light-shielding layer SLD can also be formed in the similar manner to the light-shielding layer BM by the manufacturing step illustrated in FIGS. 5A to 5C. In that case, the transparent resin layer TRN is formed in the region in which the pinhole PH is formed in contact with the base BA (refer to FIG. 5A). The transparent resin layer TRN and the base BA are covered to form the light-shielding resin material film which is used as a material of the light-shielding layer SLD (refer to FIG. 5B). The resin material film is exposed, developed, and post-baked to form the transparent resin layer TRN and the light-shielding layer SLD. Accordingly, the pinhole (pinhole PHs in FIG. 2) is formed (refer to FIG. 5C).

Though not illustrated in FIGS. 5A to 5C, the substrate SUB2 is formed by covering the transparent resin layer TRN and the light-shielding layer BM to form the insulating layer OC and further forming the alignment film on the insulating layer OC. The electronic apparatus ERP is formed by sandwiching and bonding the liquid crystal layer LCL between the substrates SUB1 and SUB2 (refer to FIG. 2).

In the present embodiment, the diameter dp of the pinhole PH is in a range of, for example, 4.5 μm or greater and 7.5 μm or less, preferably 5.5 μm or greater and 6.5 μm or less, and more preferably 6.0 μm.

In a case where the thickness d2 of the resin material film BMM is within the range described above and the transparent resin layer TRN is not used, it may be difficult to form the diameter dp within such a range. As described above, in a case where the exposure amount is not sufficient in the region in which the pinhole PH is formed, there is a possibility that the light does not reach the bottom portion of the resin material film BMM. In that case, the resin material film BMM remains in the pinhole PH. There is a possibility that the light is shielded by the remaining resin material film BMM, and thus the pinhole PH does not function as a pinhole.

Therefore, as described in the present embodiment, by providing the transparent resin layer TRN in advance, the pinhole PH having sufficient translucency can be obtained. In the present embodiment, it is possible to obtain the light-shielding layer BM having sufficient light-shielding property together with the pinhole PH having sufficient translucency. The optical adjustment element LAM having the pinhole PH and the light-shielding layer BM can shield unnecessary reflected light in sensing unevenness of a fingerprint by an optical fingerprint sensor. In other words, the light reflected from the unevenness of the fingerprint, which is not a sensing target of the sensor element SNE, is shielded by the optical adjustment element LAM. As described above, according to the present embodiment, it is possible to obtain a high-performance electronic apparatus including the optical fingerprint sensor and the optical adjustment element LAM.

Configuration Example 1

Figure 6:
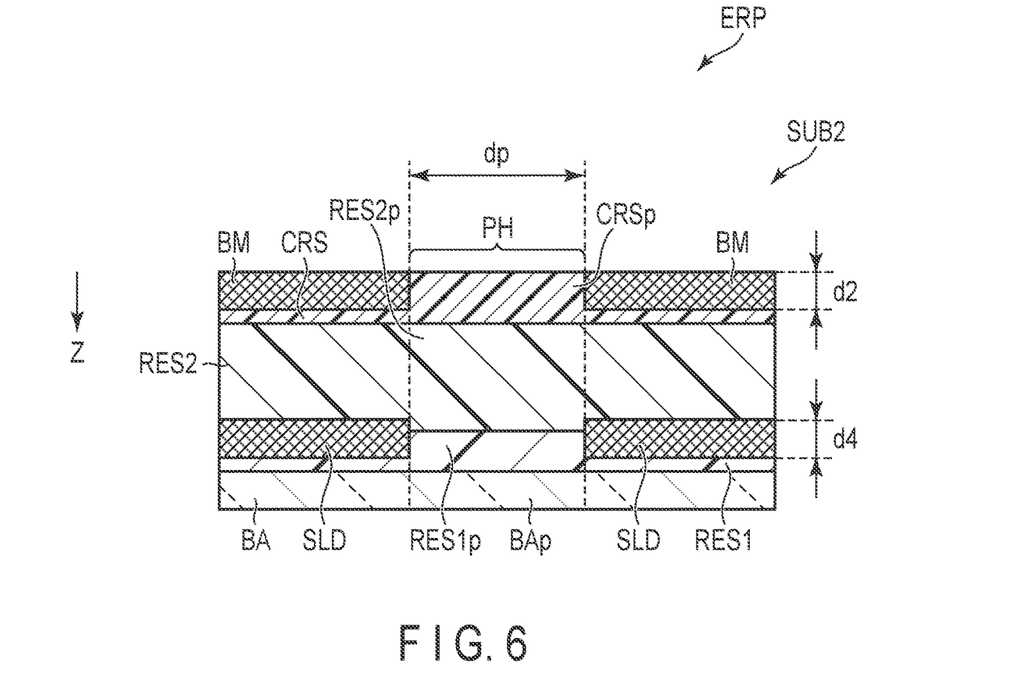
FIG. 6 is a cross-sectional view illustrating a configuration example of the electronic apparatus according to the embodiment.

FIG. 6 is a cross-sectional view illustrating another configuration example of the electronic apparatus according to the embodiment. The configuration example illustrated in FIG. 6 differs from the configuration example illustrated in FIGS. 5A to 5C in that the transparent resin layer is not formed in an island-like shape.

FIG. 6 is a partial cross-sectional view of the substrate SUB2 included in the electronic apparatus ERP.

In FIG. 6, an insulating layer RES1 is provided in contact with the base BA in a direction opposite to the third direction Z.

The light-shielding layers SLD are provided so as to overlap with a part of the base BA and sandwich a part of the insulating layer RES1. The distance between adjacent light-shielding layers SLD (diameter of the pinhole PHs in FIG. 2) is the diameter dp of the pinhole PH. However, the distance between adjacent light-shielding layers SLD is not limited to this. As in the embodiment, the light-shielding layer SLD has a function of shielding unnecessary light among the light reaching the sensor element SNE.

An insulating layer RES2 is provided so as to cover the insulating layer RES1 and the light-shielding layer SLD. A thickness of the insulating layer RES2 may be greater than a thickness of the insulating layer RES1.

An insulating layer CRS is provided in contact with the insulating layer RES2. The material of the insulating layer CRS is a colored resin material that shields the light having a certain wavelength described above. As the insulating layer CRS, for example, a colored resin layer that shields infrared light is provided. The material of the insulating layers RES1 and RES2 may be a resin material different from that of the insulating layer CRS. The insulating layers RES1 and RES2 can be collectively regarded as one insulating layer.

The light-shielding layer BM is provided at a position in contact with the insulating layer CRS and overlapping with the light-shielding layer SLD. An end portion of the light-shielding layer BM may coincide with an end portion of the light-shielding layer SLD in a direction opposite to the third direction Z. The distance between adjacent light-shielding layers BM is the diameter dp of the pinhole PH. The thickness d2 of the light-shielding layer BM and a thickness d4 of the light-shielding layer SLD may be the same. That is, the thickness d2 and the thickness d4 may be in a range of, for example, 1.05 µm or greater and 2.2 µm or less, preferably 1.4 µm or greater and 1.6 µm or less, and more preferably 1.5 µm.

As illustrated in FIG. 6, the insulating layer CRS is provided over a region that does not overlap with the light-shielding layer BM and a region that overlaps with the light-shielding layer BM. That is, the insulating layer CRS is provided over a region that overlaps with the pinhole PH and a region that does not overlap with the pinhole PH.

In FIG. 5A to FIG. 5C, the transparent resin layer TRN having an island-like shape was formed only at a position overlapping with the pinhole PH. However, as illustrated in FIG. 6, the insulating layer CRS may be continuously provided in the region that does not overlap with the pinhole PH. Even in the example illustrated in FIG. 6, the exposure step (refer to Step S105 in FIG. 4) can be performed on the light-shielding resin material film with a sufficient exposure amount. According to this, the light-shielding resin material film overlapping with the pinhole PH can be assuredly removed. Therefore, the pinhole PH having sufficient translucency can be obtained.

In FIG. 6, in the region overlapping with the pinhole PH, a part of the insulating layer CRS is an insulating layer CRSp, a part of the insulating layer RES2 is an insulating layer RES2p, a part of the insulating layer RES1 is an insulating layer RES1p, and a part of the base BA is a base BAp.

Figure 7:
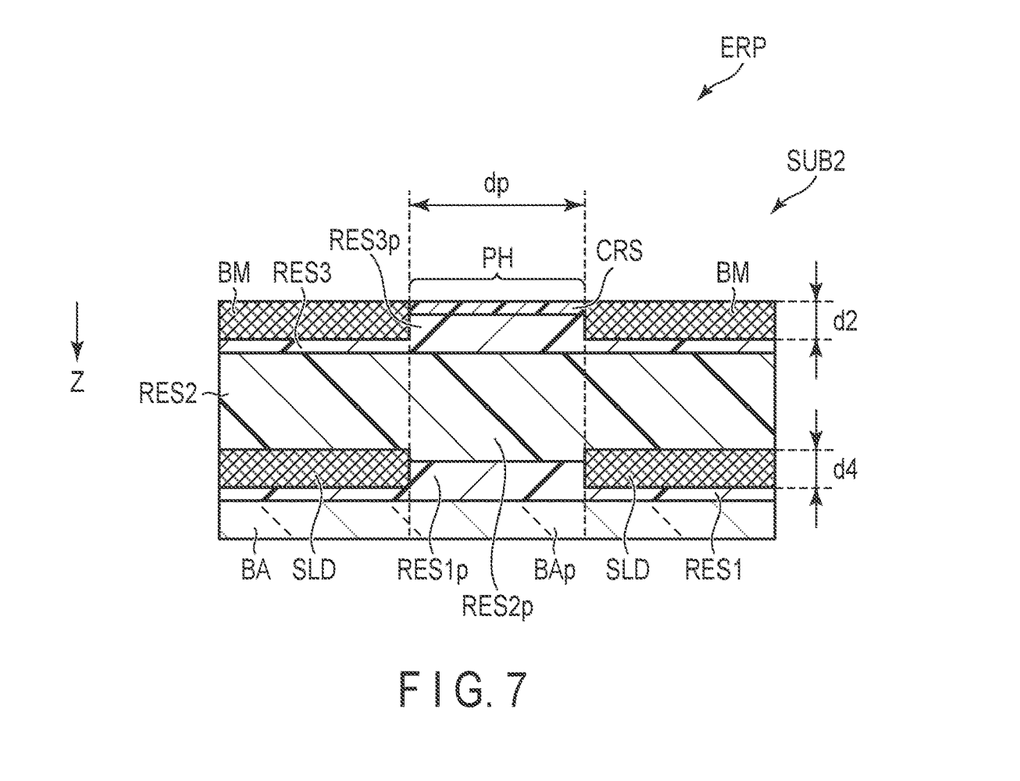
FIG. 7 is a cross-sectional view illustrating a configuration example of the electronic apparatus according to the embodiment.

FIG. 7 is a cross-sectional view illustrating another configuration example of the electronic apparatus according to the embodiment. The configuration example illustrated in FIG. 7 differs from the configuration example illustrated in FIG. 6 in that the light having a certain wavelength is shielded and a part of the colored resin material is replaced with another resin material.

In the example illustrated in FIG. 7, a stacked structure up to the insulating layer RES2 is the same as that in FIG. 6. Therefore, for the stacked structure up to the insulating layer RES2, the explanation in FIG. 6 is adopted and an explanation for the stacked structure up to the insulating layer RES2 will be omitted.

An insulating layer RES3 is provided in contact with the insulating layer RES2. The insulating layer RES2 is sandwiched between the insulating layers RES1 and RES3. The thickness of the insulating layer RES2 may be greater than each of the thickness of the insulating layer RES1 and the thickness of the insulating layer RES3. A thickness of the insulating layer RES3 may be the same as the thickness of the insulating layer RES1. The material of the insulating layers RES1, RES2, and RES3 may be a resin material different from that of the insulating layer CRS. The insulating layers RES1, RES2, and RES3 can be collectively regarded as one insulating layer.

The light-shielding layer BM is provided at a position in contact with the insulating layer RES3 and overlapping with the light-shielding layer SLD. In the similar manner to FIG. 6, the end portion of the light-shielding layer BM may coincide with the end portion of the light-shielding layer SLD in a direction opposite to the third direction Z. The distance between adjacent light-shielding layers BM is the diameter dp of the pinhole PH.

The insulating layer CRS is provided in contact with the insulating layer RES3 between the adjacent light-shielding layers BM. The insulating layer CRS is a colored resin layer that shields the light having a certain wavelength described above.

In FIG. 7, the insulating layer CRS is formed in the region overlapping with the pinhole PH. It can be said that the insulating layer CRS is provided inside the pinhole PH. On the other hand, the insulating layer RES3 is continuously provided in the region that overlaps with the pinhole PH and the region that does not overlap with the pinhole PH. The insulating layers RES3 and CRS illustrated in FIG. 7 are disposed at the same positions as that of the insulating layer CRS illustrated in FIG. 6. That is, it can be said that the insulating layers RES3 and CRS in FIG. 7 replace the insulating layer CRS in FIG. 6.

In FIG. 7, in the region overlapping with the pinhole PH, a part of the base BA is the base BAp, a part of the insulating layer REST is the insulating layer RES1p, a part of the insulating layer RES2 is the insulating layer RES2p, and a part of the insulating layer RES3 is an insulating layer RES3p.

Figure 8:
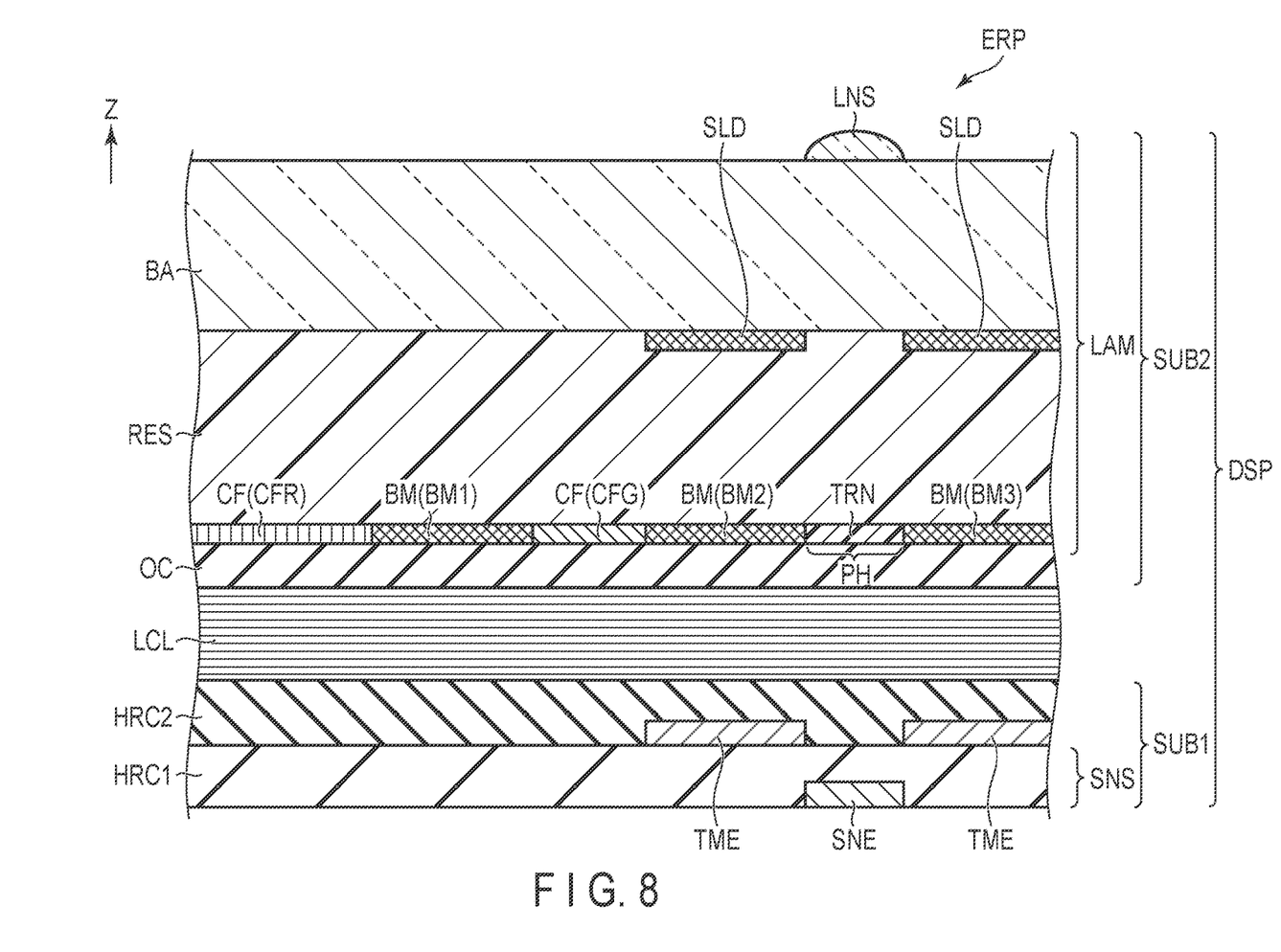
FIG. 8 is a schematic cross-sectional view of the electronic apparatus including the configurations of FIGS. 6 and 7.

FIG. 8 is a schematic cross-sectional view of the electronic apparatus including the configurations of FIGS. 6 and 7.

In the electronic apparatus ERP illustrated in FIG. 8, the components other than the transparent resin layer TRN are the same as those in FIG. 2, and the description thereof is adopted.

The transparent resin layer TRN in FIG. 8 corresponds to the insulating layer CRSp in FIG. 6, and the insulating layers CRS and RES3p in FIG. 7. As described in the configuration example, the transparent resin layer TRN may be a part of a solid film instead of the independently formed transparent resin layer TRN having an island-like shape.

Also in the configuration example, the same effect as that of the embodiment is obtained.

Configuration Example 2

FIGS. 9A to 9D are cross-sectional views illustrating a configuration example of the electronic apparatus according to the embodiment. The configuration examples illustrated in FIGS. 9A to 9D differ from the configuration examples illustrated in FIGS. 5A to 5C in that the pinhole is formed by using a halftone mask.

FIGS. 9A to 9D are cross-sectional views illustrating a manufacturing step of the pinhole of the present configuration example. However, in order to make the drawings easier to understand, the light-shielding layer SLD, the insulating layer RES, and the color filter CF are not illustrated in FIGS. 9A to 9D.

Figure 9A:
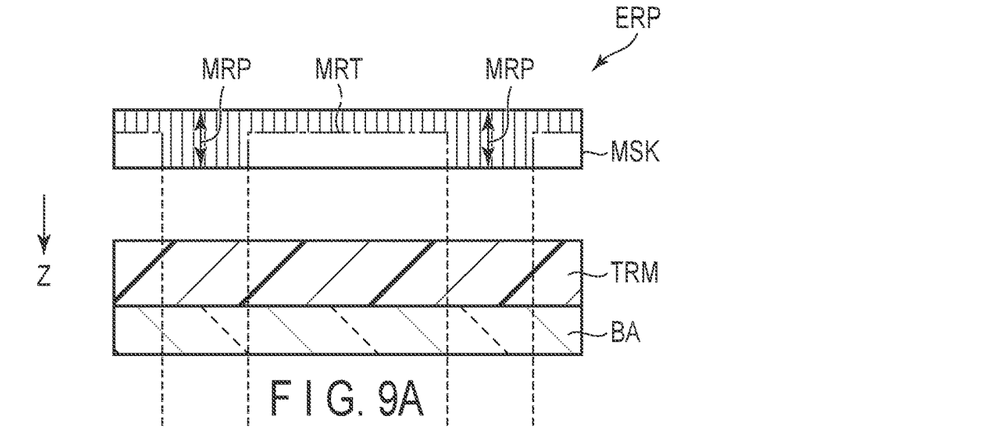
FIG. 9A is a cross-sectional view illustrating a configuration example of an electronic apparatus according to the embodiment.

As illustrated in FIG. 9A, a transparent resin film TRM is applied to the region in which the pinhole PH is formed by overlapping the base BA. The transparent resin film TRM is a resin film that shields the light having a certain wavelength described above, and is, for example, a colored resin film that shields infrared light.

A halftone mask MSK is disposed to be opposed to the transparent resin film TRM. In FIG. 9A, a light transmittance of the halftone mask MSK is illustrated by MRT for convenience.

The halftone mask MSK is a photomask with nonuniform light transmittance MRT. The light transmittances MRT illustrated in FIG. 9A are different in the region in which the pinhole PH is formed and the region in which the pinhole PH is not formed. The light transmittance corresponding to the region in which the pinhole PH is formed is MRP. Specifically, in a case where the transparent resin film TRM is a negative type resin, the light transmittance MRP is higher than the light transmittance of the region in which the pinhole PH is not formed. The light transmittance MRP may be 100%, and the light transmittance of the region in which the pinhole PH is not formed may be in a range of, for example, 40% or greater and 70% or less.

Figure 9B:
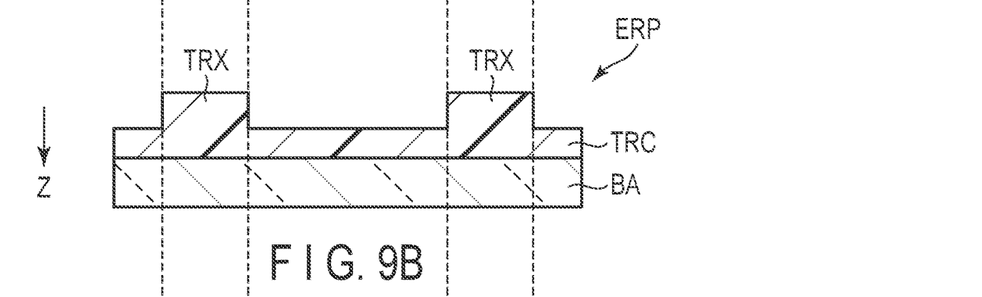
FIG. 9B is a cross-sectional view illustrating a configuration example of the electronic apparatus according to the embodiment.

The exposure is performed by using the halftone mask MSK (refer to FIG. 9A), and the development and the baking are performed to form a transparent resin layer TRC having a convex region (refer to FIG. 9B). When the convex region is a transparent resin layer TRX, the transparent resin layer TRX corresponds to the transparent resin layer TRN of FIG. 2.

Figure 9C:
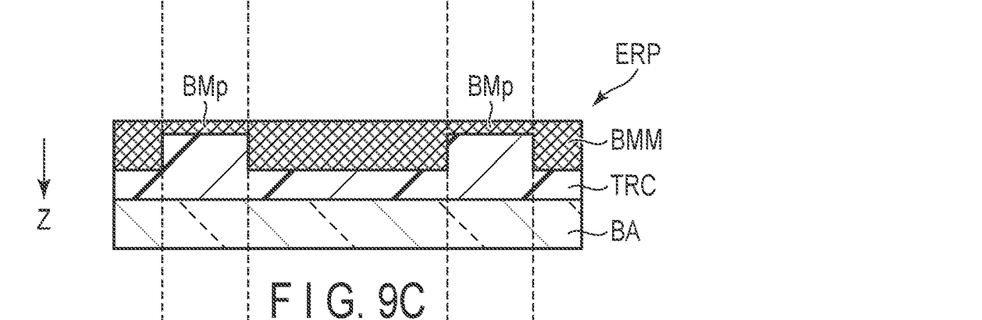
FIG. 9C is a cross-sectional view illustrating a configuration example of the electronic apparatus according to the embodiment.

The light-shielding resin material film BMM is applied by covering the transparent resin layer TRC (refer to FIG. 9C). The resin material film BMM is provided over a region that overlaps with the region in which the pinhole PH is formed and a region that does not overlap with the region in which the pinhole PH is formed. The thickness of the resin material film BMM (referred to as the resin material film BMp) overlapping with the transparent resin layer TRX is smaller than a region in which the transparent resin layer TRX is not provided. In other words, the thickness of the resin material film BMM in a region overlapping the region in which the pinhole PH is formed is smaller than the thickness of the resin material film BMM in a region that does not overlap with the region in which the pinhole PH is formed.

Figure 9D:
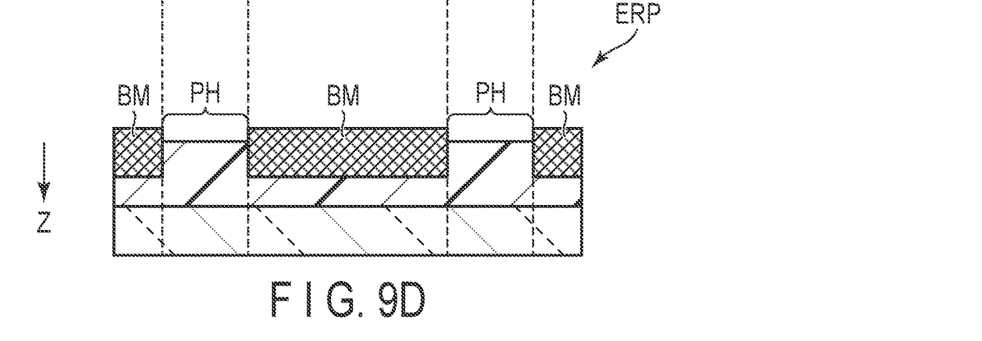
FIG. 9D is a cross-sectional view illustrating a configuration example of the electronic apparatus according to the embodiment.

An exposure and a development are performed on the resin material film BMM (refer to FIG. 9D). As a result, the resin material film BMp provided in contact with the transparent resin layer TRX can be assuredly removed. The transparent resin layer TRX is exposed by removing the resin material film BMp. Accordingly, the pinhole PH is formed. The light-shielding layer BM is formed in a region that does not overlap with the transparent resin layer TRX.

Also in the configuration example, the same effect as that of the embodiment is obtained.

Configuration Example 3

Figure 10A:
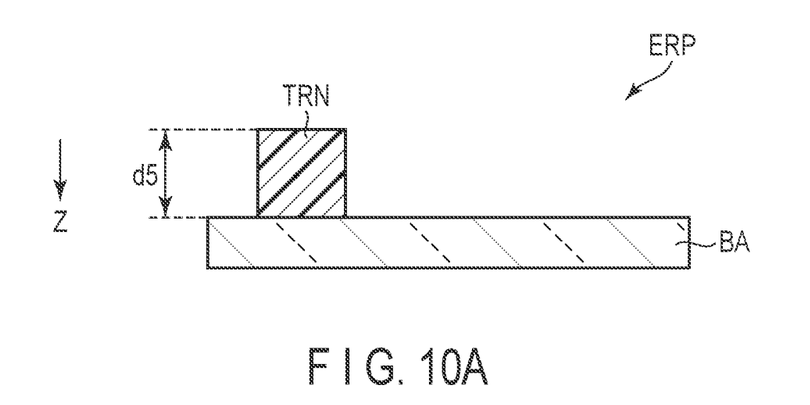
FIG. 10A is a cross-sectional view illustrating a configuration example of the electronic apparatus according to the embodiment.
Figure 10B:
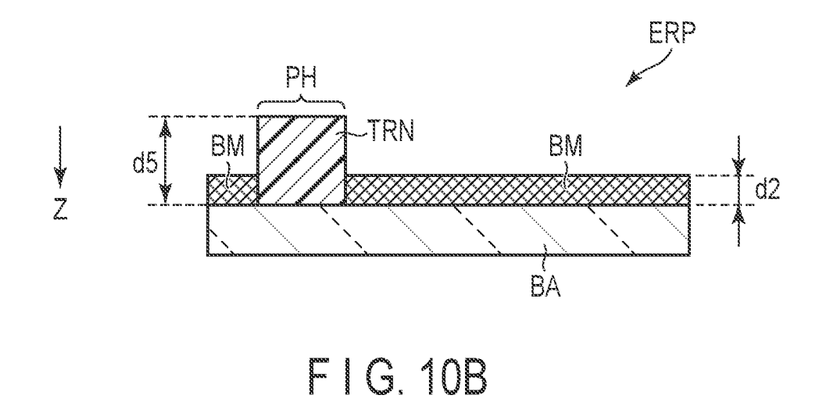
FIG. 10B is a cross-sectional view illustrating a configuration example of the electronic apparatus according to the embodiment.

FIGS. 10A and 10B are cross-sectional views illustrating a configuration example of the electronic apparatus according to the embodiment. The configuration examples illustrated in FIGS. 10A and 10B differs from the configuration examples illustrated in FIGS. 5A to 5C in that the thickness of the transparent resin layer is greater than the thickness of the light-shielding layer.

First, in the similar manner to FIG. 5A, the transparent resin layer TRN having an island-like shape is formed (refer to FIG. 10A). However, the material of the transparent resin layer TRN may be not only the colored resin material having a function of shielding the light having a certain wavelength described above but also a resin material used as a photo-spacer. The thickness of the transparent resin layer TRN having an island-like shape illustrated in FIG. 10A is d5.

In the similar manner to FIGS. 5B and 5C, the light-shielding resin material film is applied, an exposure and a development are performed on the light-shielding resin material to form the light-shielding layer BM having the thickness d2 (refer to FIG. 10B). The thickness d2 is smaller than a thickness d5. That is, the transparent resin layer TRN protrudes from the light-shielding layer BM. The light-shielding layer BM is not provided on a portion in which the transparent resin layer TRN protrudes in a direction opposite to the third direction Z.

The thickness d5 may be in a range of, for example, 2.5 μm or greater and 7.5 μm or less, and preferably 4 μm or greater and 5 μm or less. As described above, the thickness d2 may be in a range of, for example, 1.05 μm or greater and 2.2 μm or less, preferably 1.4 μm or greater and 1.6 μm or less, and more preferably 1.5 μm. The difference between the thicknesses d5 and d2 may be in a range of 2 μm or greater and 4 μm or less, and preferably 3 μm.

Figure 11:
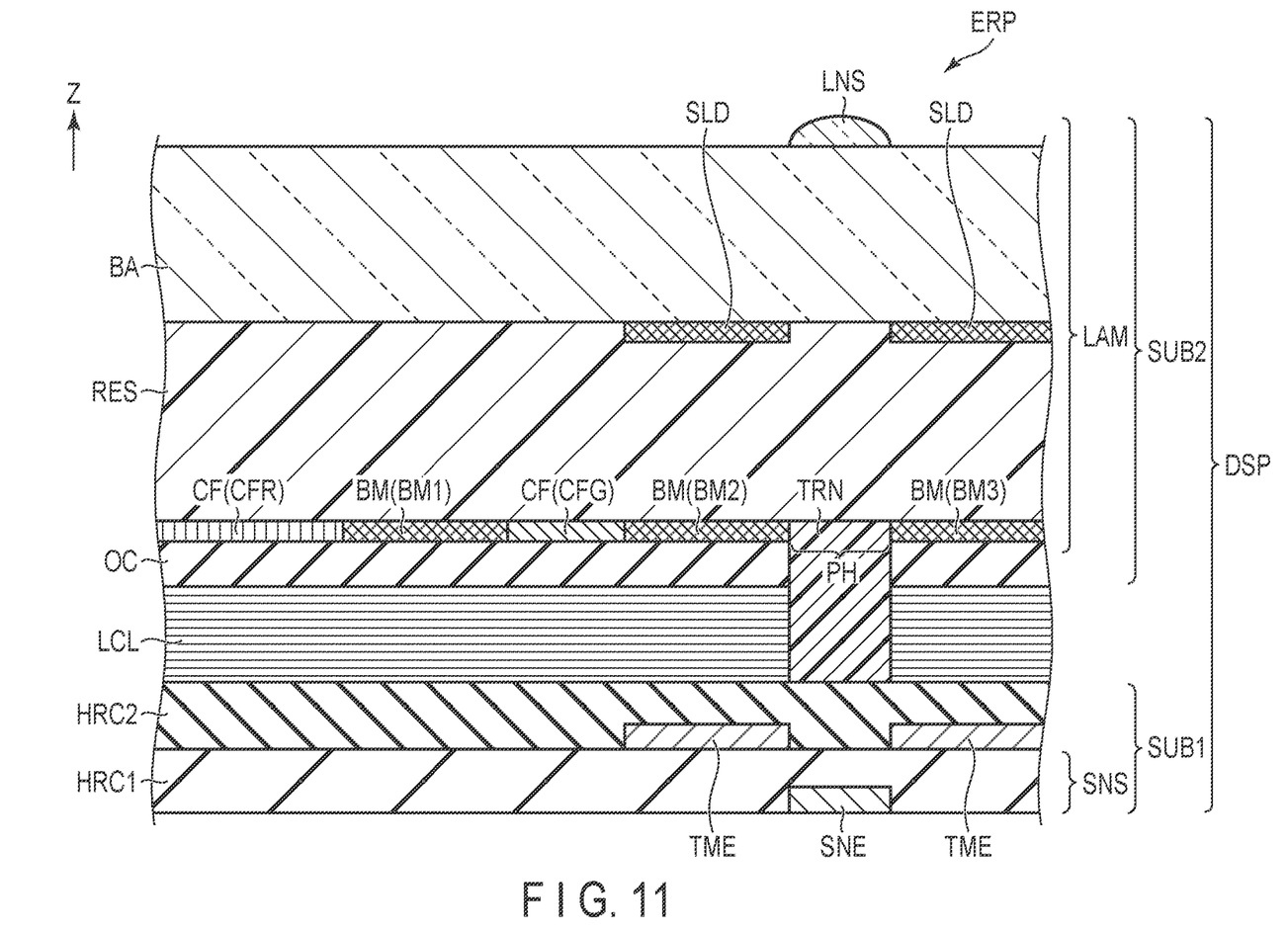
FIG. 11 is a schematic cross-sectional view of the electronic apparatus including the configurations of FIGS. 10A and 10B.

FIG. 11 is a schematic cross-sectional view of the electronic apparatus including the configurations of FIGS. 10A and 10B. The transparent resin layer TRN of the configuration example, for example, functions as a spacer maintaining a distance between the substrates SUB1 and SUB2 in a step of polishing the base (not illustrated) of the substrate SUB1 and the base BA of the substrate SUB2. The spacer in contact with the light-shielding layer BM may be provided separately from the transparent resin layer TRN. Another spacer having a different height may be formed in the same layer as the transparent resin layer TRN.

Also in the configuration example, the same effect as that of the embodiment is obtained.

In the present disclosure, the light-shielding layer TME, the light-shielding layer SLD, and the light-shielding layer BM are also referred to as a first light-shielding layer, a second light-shielding layer, and a third light-shielding layer, respectively. The pinholes PHt, PHs, and PH are also referred to as a first pinhole, a second pinhole, and a third pinhole, respectively.

The insulating layer RES2 illustrated in FIG. 6 is also referred to as a first insulating layer, and the insulating layer CRS is also referred to as a second insulating layer. Alternatively, the insulating layers RES1 and RES2 may be collectively referred to as the first insulating layer.

The insulating layers RES2 and RES3 illustrated in FIG. 7 are collectively referred to as the first insulating layer, and the insulating layer CRS is also referred to as the second insulating layer. Alternatively, the insulating layers RES1, RES2, and RES3 may be collectively referred to as the first insulating layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first substrate that includes
a sensor element,
first light-shielding layers, and
a first pinhole that overlaps with the sensor element and is provided between adjacent of the first light-shielding layers; and
a second substrate that includes
a base,
second light-shielding layers that are provided in contact with the base,
a second pinhole that overlaps with the sensor element and is provided between adjacent of the second light-shielding layers,
an insulating layer that covers the second light-shielding layers and the second pinhole,
third light-shielding layers that are in contact with the insulating layer,
a third pinhole that overlaps with the sensor element and is provided between adjacent of the third light-shielding layers, and
a lens that is in contact with the base and provided on a surface opposite to the second light-shielding layers, wherein
a transparent resin layer is provided inside the third pinhole.

2. The electronic apparatus according to claim 1, wherein the transparent resin layer is a colored resin layer that shields light having a certain wavelength.

3. The electronic apparatus according to claim 2, wherein the light having the certain wavelength is infrared light.

4. The electronic apparatus according to claim 1, wherein a thickness of each of the third light-shielding layers is greater than a thickness of the transparent resin layer.

5. The electronic apparatus according to claim 1, wherein a thickness of each of the third light-shielding layers is smaller than a thickness of the transparent resin layer.

6. The electronic apparatus according to claim 1, wherein the first pinhole, the second pinhole, and the third pinhole have the same diameter.

7. The electronic apparatus according to claim 1, wherein a thickness of each of the second light-shielding layers and a thickness of each of the third light-shielding layers are the same.

8. The electronic apparatus according to claim 1, wherein the second light-shielding layers and the third light-shielding layers are formed of a resin material having a light-shielding property.

9. The electronic apparatus according to claim 1, wherein the first light-shielding layers are formed of a metal material.

10. The electronic apparatus according to claim 1, wherein a liquid crystal layer is sandwiched between the first substrate and the second substrate.

11. An electronic apparatus comprising:
a first substrate that includes
a sensor element,
first light-shielding layers, and
a first pinhole that overlaps with the sensor element and is provided between adjacent of the first light-shielding layers; and
a second substrate that includes
a base,
second light-shielding layers that are provided so as to be overlapped with a part of the base,
a second pinhole that overlaps with the sensor element and is provided between adjacent of the second light-shielding layers,
a first insulating layer that covers the second light-shielding layers and the second pinhole,
a second insulating layer that is provided in contact with the first insulating layer,
third light-shielding layers that are in contact with the second insulating layer,
a third pinhole that overlaps with the sensor element, is provided between adjacent of the third light-shielding layers, and is in contact with the second insulating layer, and
a lens that is in contact with the base and provided on a surface opposite to the second light-shielding layers, wherein
the second insulating layer is a colored resin layer that shields light having a certain wavelength.

12. The electronic apparatus according to claim 11, wherein the first pinhole, the second pinhole, and the third pinhole have the same diameter.

13. The electronic apparatus according to claim 11, wherein a thickness of each of the second light-shielding layers and a thickness of each of the third light-shielding layers are the same.

14. The electronic apparatus according to claim 11, wherein the second light-shielding layers and the third light-shielding layers are formed of a resin material having a light-shielding property.

15. The electronic apparatus according to claim 11, wherein the first light-shielding layers are formed of a metal material.

16. An electronic apparatus comprising:
a first substrate that includes
a sensor element,
first light-shielding layers, and
a first pinhole that overlaps with the sensor element and is provided between adjacent of the first light-shielding layers; and
a second substrate that includes
a base,
second light-shielding layers that are provided so as to be overlapped with a part of the base,
a second pinhole that overlaps with the sensor element and is provided between adjacent of the second light-shielding layers,
a first insulating layer that covers the second light-shielding layers and the second pinhole,
third light-shielding layers that are in contact with the first insulating layer,
a third pinhole that overlaps with the sensor element, is provided between adjacent of the third light-shielding layers, and is in contact with the first insulating layer,
a second insulating layer that is provided inside the third pinhole, is provided between the adjacent of the third light-shielding layers, and
a lens that is in contact with the base and provided on a surface opposite to the second light-shielding layer, wherein
the second insulating layer is a colored resin layer that shields light having a certain wavelength.

17. The electronic apparatus according to claim 16, wherein the first pinhole, the second pinhole, and the third pinhole have the same diameter.

18. The electronic apparatus according to claim 16, wherein a thickness of each of the second light-shielding layers and a thickness of each of the third light-shielding layers are the same.

19. The electronic apparatus according to claim 16, wherein the second light-shielding layers and the third light-shielding layers are formed of a resin material having a light-shielding property.

20. The electronic apparatus according to claim 16, wherein the first light-shielding layers are formed of a metal material.

* * * * *